(12) United States Patent
Hu et al.

(10) Patent No.: US 10,048,445 B2
(45) Date of Patent: Aug. 14, 2018

(54) MULTICAST EXCHANGE OPTICAL SWITCH

(71) Applicant: Accelink Technologies Co., Ltd., Wuhan (CN)

(72) Inventors: Qianggao Hu, Wuhan (CN); Liping Sun, Wuhan (CN); Bo Zhang, Wuhan (CN); Leilei Hu, Wuhan (CN); Liu Yang, Wuhan (CN); Yuan Zhang, Wuhan (CN); Fei Liang, Wuhan (CN)

(73) Assignee: Accelink Technologies Co., Ltd. (CN)

( * ) Notice: Subject to any disclaimer, the term of this patent is extended or adjusted under 35 U.S.C. 154(b) by 0 days.

(21) Appl. No.: 15/523,206

(22) PCT Filed: Dec. 18, 2014

(86) PCT No.: PCT/CN2014/094188
§ 371 (c)(1),
(2) Date: Apr. 28, 2017

(87) PCT Pub. No.: WO2016/065708
PCT Pub. Date: May 6, 2016

(65) Prior Publication Data
US 2017/0315300 A1    Nov. 2, 2017

(30) Foreign Application Priority Data
Oct. 31, 2014  (CN) .......................... 2014 1 0606115

(51) Int. Cl.
*G02B 6/35* (2006.01)
*G02B 6/32* (2006.01)
*G02B 6/293* (2006.01)

(52) U.S. Cl.
CPC ....... *G02B 6/3518* (2013.01); *G02B 6/29305* (2013.01); *G02B 6/32* (2013.01); *G02B 6/3546* (2013.01)

(58) Field of Classification Search
CPC ............................ G02B 6/3518; G02B 6/3556
See application file for complete search history.

(56) References Cited

U.S. PATENT DOCUMENTS

2007/0077003 A1    4/2007  Aota et al.
2007/0104418 A1    5/2007  McGuire
(Continued)

FOREIGN PATENT DOCUMENTS

CN    102608710 A    7/2012
CN    103543497 A    1/2014
(Continued)

OTHER PUBLICATIONS

International Search Report for Application No. PCT/CN2014/094188 dated Aug. 3, 2015.

*Primary Examiner* — Omar R Rojas
(74) *Attorney, Agent, or Firm* — Lerner, David, Littenberg, Krumholz & Mentlik, LLP

(57) ABSTRACT

A multicast exchange optical switch includes an input port device including M input ports, an output port device including N output ports, a diffractive beam splitter, an optical focusing component, and a 1×N array of reflective devices. The diffractive beam splitter diffracts each input signal beam from the input ports into at least N directions. The optical focusing component includes a first focusing lens and a second focusing lens. The first focusing lens focuses sub-beams from the respective input ports along the Y-axis direction having the same diffraction order. The second focusing lens focuses on the X-axis direction sub-beams from the same input port having different diffraction orders. The 1×N array of reflective devices is provided at the focal plane of the optical focusing component and each reflective device reflects a sub-beam from any one of the input ports to any one of the output ports.

15 Claims, 6 Drawing Sheets

(56) References Cited

U.S. PATENT DOCUMENTS

2013/0209030 A1* 8/2013 Colbourne ........... G02B 6/3518
  385/17
2015/0124187 A1   5/2015 Xie et al.
2016/0291255 A1* 10/2016 Hu ....................... G02B 6/3518

FOREIGN PATENT DOCUMENTS

| CN | 103558667 A | 2/2014 |
| CN | 103969748 A | 8/2014 |

\* cited by examiner

MULTICAST EXCHANGE OPTICAL SWITCH

CROSS REFERENCE TO RELATED APPLICATIONS

The present application is a national phase entry under 35 U.S.C. § 371 of International Application No. PCT/CN2014/094188, filed Dec. 18, 2014, which claims priority from Chinese Patent Application No. 201410606115.5, filed Oct. 31, 2014, all of which are hereby incorporated herein by reference.

FIELD OF THE INVENTION

The present invention generally relates to optical switch and, more particularly, to a multicast exchange optical switch. The present invention belongs to the field of optical fiber communication.

BACKGROUND OF THE INVENTION

Multicast exchange optical switch is a wavelength-independent optical device, which splits an input beam into a plurality of output beams and directs them to different output ports. As one of key components in the Reconfigurable Optical Add-Drop Multiplexer (ROADM) system of the next generation, the multicast exchange optical switch is generally used in conjunction with a wavelength selective optical switch to accomplish colorless, directionless and contentionless features for the ROADM system, which are important to increase flexibility and reduce cost of the network construction.

Currently, most commercial available multicast exchange switches are implemented in a splicing form or an integrated form. When the multicast exchange switch is configured with discrete planar lightwave circuit (PLC) splitters and switches spliced together, ports of these splitters and switches need to be interconnected through a number of optical fibers. As the number of ports increases, assembling challenges become much higher and size of the switch becomes larger. Alternatively, the multicast exchange optical switch may be configured as a single monolithic PLC integrated with a plurality of splitters and switches. However, such an integrated configuration is difficult to fabricate, needs special manufacture equipments, and has high power consumption due to control of the PLC switches.

SUMMARY OF THE INVENTION

An object of the present invention is to overcome a technical defect in the prior art by providing a multicast exchange optical switch having a compact structure, easy to assemble, and low cost.

A technical solution of the present invention is as follows.

A multicast exchange optical switch includes an input port device having M input ports, an output port device having N output ports, a diffractive beam splitter, an optical focusing component, and a 1×N array of reflective devices, where the input ports are arranged along a Y-axis direction, and the output ports are arranged along an X-axis direction. The diffractive beam splitter diffracts each input signal beam from the input ports into at least N directions going towards the optical focusing component, and the optical focusing component includes a first focusing lens and a second focusing lens which have rear focal planes coincided with each other. The first focusing lens focuses sub-beams from the respective input ports distributed along the Y-axis direction having the same diffraction order, and the second focusing lens focuses on the X axis individual sub-beams from the same input port having different diffraction orders, respectively. The 1×N array of reflective devices are provided at the focal plane of the optical focusing component, and each reflective device is positioned at a focus point of the respective diffraction orders of signal beams to reflect a sub-beam from any one of the input ports to any one of the output ports.

The input ports and the output ports may include an array of optical fibers, with an array of micro-lens being provided at an output/input end of the fibers for optical collimation.

The input ports and the output ports may include an array of collimators, with a first beam-expanding micro-lens and a fifth beam-expanding micro-lens, both of which are X-axis cylindrical lenses, being provided at an output/input end of each collimator. The first beam-expanding micro-lens has a focal length $f_3$ smaller than a focal length $f_4$ of the fifth beam-expanding micro-lens. The array of collimators is positioned at the front focal plane of the first beam-expanding micro-lenses. The rear focal plane of the first beam-expanding micro-lens is coincided with the front focal plane of the fifth beam-expanding micro-lens.

The first focusing lens is a Y-axis cylindrical lens, and the second focusing lens is an X-axis cylindrical lens.

Each of the input ports and the output ports in the optical fiber array is configured with a Y-axis micro cylindrical lens and an X-axis micro cylindrical lens, and the input/output port is positioned at the front focal plane of the corresponding Y-axis and X-axis micro cylindrical lenses. The X-axis micro cylindrical lens has a focal length $f_1$ larger than a focal length $f_2$ of the Y-axis micro cylindrical lens.

The diffractive beam splitter may be a reflective grating or a transmissive grating.

The 1×N array of reflective devices is an MEMS mirror array, and each mirror may rotate about its first rotation axis and second rotation axis to perform signal switching. The first rotation axis is parallel to the X axis, and the second rotation axis is parallel to the Y axis.

A first input port and a second input port are connected in series with a first isolator and a second isolator, respectively.

The device of the present invention has advantages of compact structure, easy to assemble, and low cost.

BRIEF DESCRIPTION OF THE DRAWINGS

In FIGS. 1 to 5, the incident beam is represented by a solid line, and the reflected beam is represented by a broken line.

| 101: first input port | 102: second input port |
| 103: third input port | |
| 111: first output port | 112: second output port |
| 113: third output port | 114: fourth output port |
| 115: fifth output port | 116: sixth output port |
| 201: first Y-axis micro cylindrical collimation lens | |
| 202: second Y-axis micro cylindrical collimation lens | |
| 211: third Y-axis micro cylindrical collimation lens | |
| 212: fourth Y-axis micro cylindrical collimation lens | |
| 221: first beam expanding micro-lens | 222: second beam expanding micro-lens |
| 231: third beam expanding micro-lens | 232: fourth beam expanding micro-lens |
| 301: first X-axis micro cylindrical collimation lens | |
| 302: second X-axis micro cylindrical collimation lens | |
| 311: third X-axis micro cylindrical collimation lens | |
| 312: fourth X-axis micro cylindrical collimation lens | |
| 321: fifth beam expanding micro-lens | 322: sixth beam expanding micro-lens |
| 331: seventh beam expanding micro-lens | 332: eighth beam expanding micro-lens |
| 400: transmissive diffraction splitter | 401: reflective diffraction splitter |
| 501: first focusing lens | 502: second focusing lens |
| 601: first mirror | 602: second mirror |
| 611: second rotation axis of mirror 601 | 612: second rotation axis of mirror 602 |
| 620: first rotation axis of mirror | |
| 701: first optical isolator | 702: second optical isolator |
| 801: first component of input signal | 802: second component of input signal |
| 803: third component of input signal | |

DETAILED DESCRIPTION OF THE PREFERRED EMBODIMENTS

The present invention will be described further in detail with reference to the drawings.

Figure 1A:
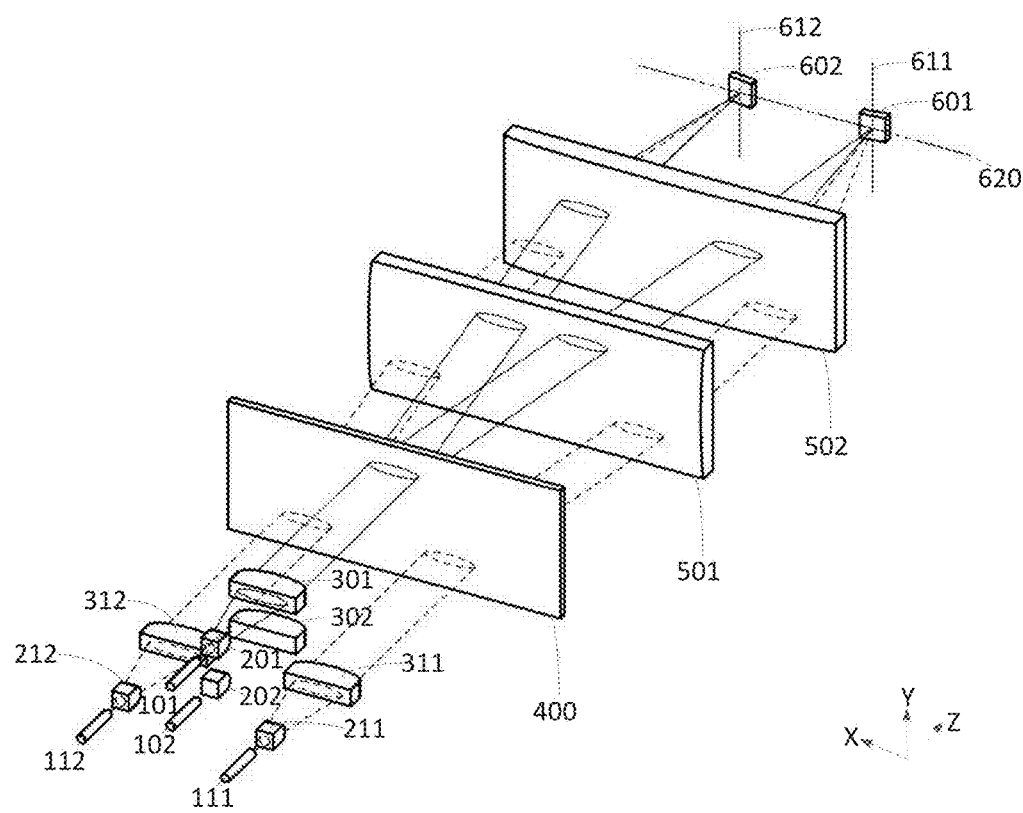
FIG. 1(a) is a schematic diagram showing a first embodiment of a multicast exchange optical switch according to the present invention.

FIG. 1(a) is a concept diagram showing a first embodiment of an M×N multicast exchange switch according to the present invention. As shown, for convenience of description, M is 2 and N is 2 in the embodiment of FIG. 1. In practice, M and N may have other values as needed, such as 4, 12, 17, or the like. The switch is configured with an input port device including M input ports, i.e., a first input port 101~a second input port 102, and an output port device including N output ports, i.e., a first output port 111~a second output port 112. M and N each is greater than or equal to 1. As shown, the first input port 101~the second input port 102 and the first output port 111~the second output port 112 may be an array of optical fibers. As signal lights emitted from the fiber array are divergent lights, an array of micro-lens are needed to collimate the lights. In FIG. 1(a), the divergent lights from the first input port 101~the second input port 102 are collimated through a first Y-axis micro cylindrical lens 201~the second Y-axis micro cylindrical lens 202 and a first X-axis micro cylindrical lens 301~the second X-axis micro cylindrical lens 302, respectively; the output lights are collimated through the third X-axis micro cylindrical lens 311~the fourth X-axis micro cylindrical lens 312 and the third Y-axis micro cylindrical lens 211~the fourth Y-axis micro cylindrical lens 212, coupled to the fiber array of the first output port 111~the second output port 112. In other embodiments of the present invention, the input ports and the output ports may be an optical coupling element known in the art, such as a collimator array, or a waveguide. When the input, output signal lights are collimated lights, it is not necessary to use the micro-lens for collimation again.

Figure 1B:
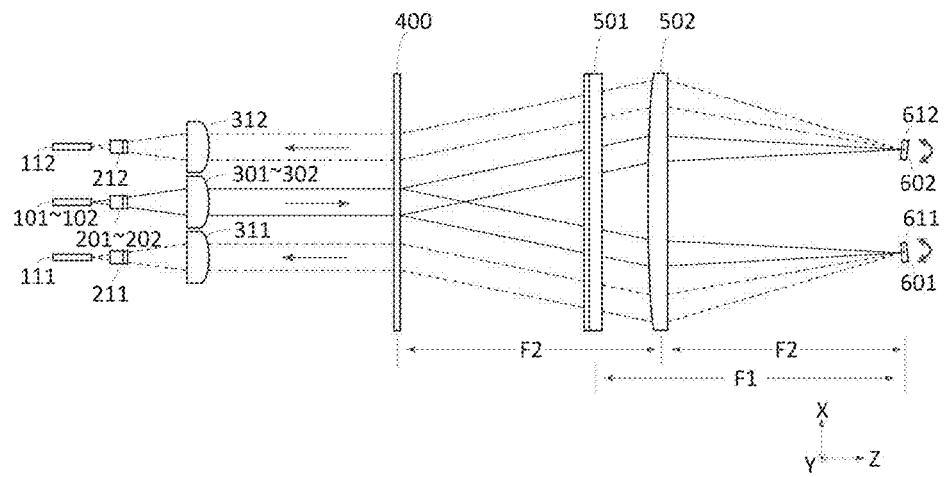
FIG. 1(b) is a top view of the first embodiment of the multicast exchange optical switch according to the present invention.

For the sake of description, an X-Y-Z three-dimensional coordinates is defined as shown in FIG. 1, in which light travels in the Z-axis direction, the first input port 101~the second input port 102 are arranged along the Y-axis direction, and the first output port 111~the second output port 112 are arranged along the X-axis direction.

As mentioned above, in this embodiment, the first input port 101~the second input port 102 and the first output port 111~the second output port 112 are an array of optical fibers, and each input/output port is configured with a Y-axis micro cylindrical lens and an X-axis micro cylindrical lens, and the input/output port is positioned at the front focal plane of the corresponding Y-axis and X-axis micro cylindrical lens. The focal length $f_1$ of the X-axis micro cylindrical lens is larger than the focal length $f_2$ of the Y-axis micro cylindrical lens so as to collimate and couple the incoming divergent light into this system, or to collimate and focus the outgoing light into an end surface of the output fiber. For example, the first input port 101 is positioned at the front focal plane of the first Y-axis micro cylindrical lens 201 and the first X-axis micro cylindrical lens 301. The focal length $f_1$ of the first X-axis micro cylindrical lens 301 is larger than the focal length $f_2$ of the first Y-axis micro cylindrical lens 201. The divergent signal light from the first input port 101 is collimated through the first Y-axis micro cylindrical lens 201 and the first X-axis micro cylindrical lens 301 sequentially, resulting in a collimated beam having a radius in the X axis greater than that in the Y axis.

Figure 2:
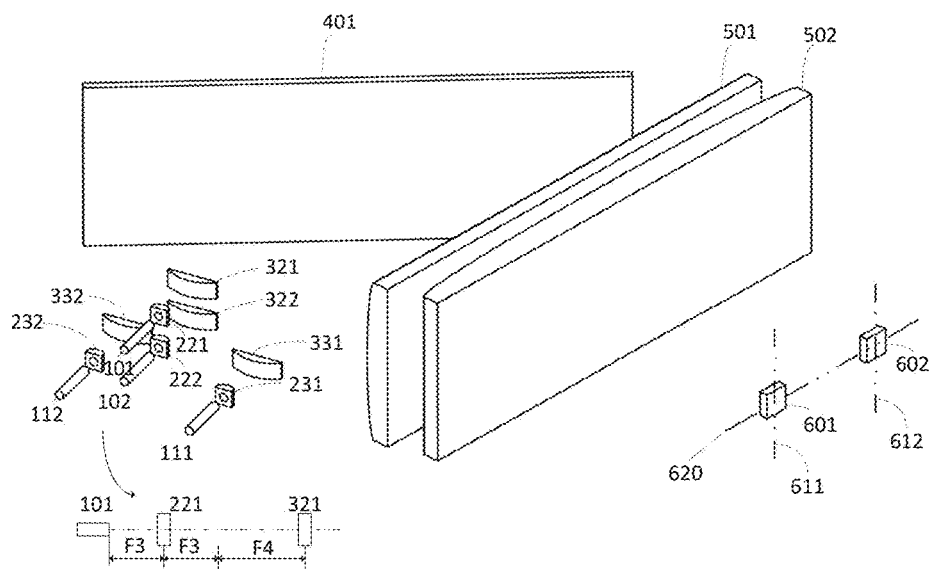
FIG. 2 is a schematic diagram showing a second embodiment of a multicast exchange optical switch according to the present invention.

If the light beam is expanded before being incident onto the diffractive element, it may help increase the interference orders and improve the resolution. When the input/output signal beam is a collimated beam, the collimated beam may be expanded through optics such as lens, straight prism, and the like, and it is not necessary to use a series of micro-lens to collimate the beam again. FIG. 2 is a schematic diagram showing an embodiment in which fiber collimators are used as input ports and output ports.

The diffractive beam splitter 400 may be a transmissive grating, which separates the incident signal beam into a plurality of sub-beams. The respective sub-beams nay have an intensity substantially equal to each other and travel in a direction that is determined by the grating equation. The diffractive beam splitter 400 may have a relatively large line spacing so that signal wavelengths of the same diffraction order have a dispersion angle much smaller than an angle between sub-beams of adjacent diffraction orders. For example, when signal light of 1550 nm is incident at 0 degree onto a diffractive beam splitter having a period d=0.1 mm, the signal beams of two adjacent orders form an angle of about 0.89 degree, while the dispersion angle for a signal beam having wavelength from 1525 nm to 1570 nm is only 0.026 degree. Thus, the respective signal sub-beams can preserve full frequency information of the input signal.

The collimated signal beam expanded on the X axis is then incident onto the diffractive beam splitter 400, resulting in a plurality of sub-beams spatially separated from each other. In FIG. 1(*a*), the diffractive beam splitter diffracts the incident light into two directions with substantially the same intensity. In practice, a suitable diffractive beam splitter may be selected depending on the number of output ports actually needed, and the number of split sub-beams of the diffractive beam splitter should be greater than or equal to the number of output ports. As described above, when the input signal beam is split by the diffractive beam splitter 400, each input signal beam will be split into N sub-beams of different directions, resulting in a total number of M×N signal sub-beams.

The optical focusing component may include a first focusing lens 501 and a second focusing lens 502. The first focusing lens 501 may be a Y-axis cylindrical lens, and the second focusing lens 502 may be an X-axis cylindrical lens. The rear focal planes of the two focusing lenses 501, 502 may be coincided with each other, and the diffractive beam splitter 400 may be positioned at the front focal plane of the second focusing lens 502. The first focusing lens 501 focuses sub-beams from the respective input ports spread along the Y axis having the same diffraction order, while the second focusing lens 502 focuses on the X axis individual sub-beams from the same input port having different diffraction order. Thus, the optical focusing component focuses the M×N signal sub-beams from the diffractive beam splitter 400 into a 1×N array of spots arranged along the X axis at the rear focal plane.

In consideration of the dispersion effect introduced by the diffractive beam splitter, various wavelengths of the signal light may slightly deviate from each other within the spot. Assume the dispersion angle previously calculated for the diffractive beam splitter having a period d=0.1 mm. When the second focusing lens 502 has a focal length of 100 mm, the maximum deviation distance among respective wavelengths is about 0.045 mm within the same spot, and a distance between spots of adjacent diffraction orders is about 1.55 mm.

The reflective devices array is a 1×N linear MEMS mirrors array, and the respective MEMS mirrors are located at the N focus spots. Each mirror can rotate about two axes, respectively, to perform switching. In the MEMS mirrors array as shown, the mirrors have a first rotation axis 620 parallel to the X axis, and respective second rotation axes, i.e. the second rotation axis 611 of the mirror 601 and the second rotation axis 612 of the mirror 602, parallel to the Y axis. The MEMS mirrors may rotate about the first rotation axis 620 to selectively couple any one of the input signals to an output port. The mirror 601 may rotate about the second rotation axis 611, and the mirror 602 may rotate about the second rotation axis 612, so as to select any one of the output ports to output.

The optical signals reflected from the MEMS mirrors travel backwards through the optical focusing component and the diffractive beam splitter, and are coupled to the output ports through the micro cylindrical lenses. In general, the forward optical propagation path and the backward optical reflection path deviate from each other in the X and Y directions, while they pass through the same optics the Z direction. The backward optical path passes through the diffractive beam splitter 400 inversely, and wavelengths previously separated by the dispersion effect will be converged and directed to the output port.

FIG. 1(*b*) shows a top view of the first embodiment of the M×N multicast exchange optical switch according to the present invention. As shown, the first input port 101~a second input port 102, the micro cylindrical lenses array including the first Y-axis micro cylindrical collimation lens 201~the second Y-axis micro cylindrical collimation lens 202 and the first X-axis micro cylindrical collimation lens 301~the second X-axis micro cylindrical collimation lens 302, are respectively arranged along a direction perpendicular to the paper plane. As shown, the input divergent beams from the first input port 101~the second input port 102 are collimated through the first Y-axis micro cylindrical collimation lens 201~the second Y-axis micro cylindrical collimation lens 202 and the first X-axis micro cylindrical collimation lens 301~the second X-axis micro cylindrical collimation lens 302, respectively, and then are incident onto the diffractive beam splitter 400, where they are diffracted into the upper and lower directions with substantially the same intensity. The diffractive beam splitter 400 is positioned at the front focal plane of the second focusing lens 502, and the MEMS mirrors array is positioned at the rear focal plane of the second focusing lens 502. The second focusing lens 502 focuses the respective diffraction orders of signal beams onto its rear focal plane, respectively, and the respective MEMS mirrors are located at the respective focusing spots of the signal beams. As shown, the first mirror 601 is located at the focusing spot of the lower diffracted beams, and the second mirror 602 is located at the focusing spot of the upper diffracted beams. The sub-beams reflected by the mirror will return to the optical focusing component and go back to the diffractive beam splitter 400 at an angle parallel with the corresponding diffracted forward components. As shown, the sub-beam reflected from the first mirror 601 passes through the optical focusing component inversely and then becomes parallel to the lower diffracted beam; similarly, the sub-beam reflected from the second mirror 602 passes through the optical focusing component inversely and then becomes parallel to the upper diffracted beam. The reflected beams become parallel with the incident beams after passing through the diffractive beam splitter 400 inversely, and are focused through the micro-lenses to the respectively output ports.

Figure 3:
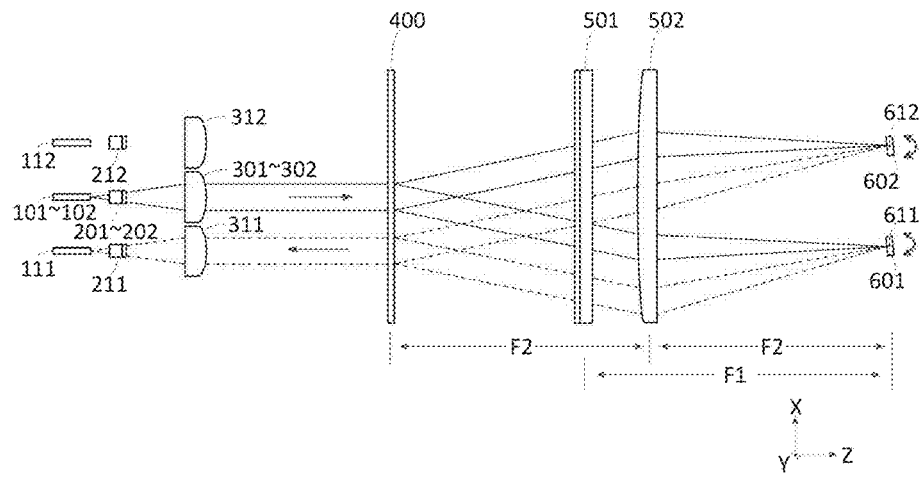
FIG. 3 shows an output port selection mode for the first embodiment of the present invention.

Any of the output ports can be selected by controlling the MEMS mirrors to rotate about respective second rotation axes parallel with the Y axis, e.g., the second rotation axis 611 of the mirror 601~the second rotation axis 612 of the mirror 602. As shown in FIG. 1(*b*), the MEMS mirrors may rotate to a proper angle so that the sub-beam reflected from the first mirror 601 is output through the first output port 111 and the sub-beam reflected from the second mirror 602 is output through the second output port 112. FIG. 3 shows a case in which all the mirrors are coupled to the same output port 111 in the first embodiment of the present invention. In this case, the MEMS mirrors are controlled to rotate about the respective second rotation axes, e.g., the second rotation axis 611 of the mirror 601~the second rotation axis 612 of the mirror 602, to a state that all the mirrors are parallel to one another, and the second output port 112 has no signal output.

The MEMS mirrors may rotate about the first rotation axis 620 parallel to the X axis so as to selectively couple a sub-signal from any one of the input ports to the output ports. As shown in the side view of the first embodiment of the M×N multicast exchange optical switch of the present invention in FIG. 1(*c*), the first mirror 601~the second mirror 602 of the MEMS mirrors array may independently rotate about the first rotation axis 620 to selectively couple any one of the signals from the first input port 101 and the second input port 102 to the first output port 111~the second output port 112.

Figure 1C:
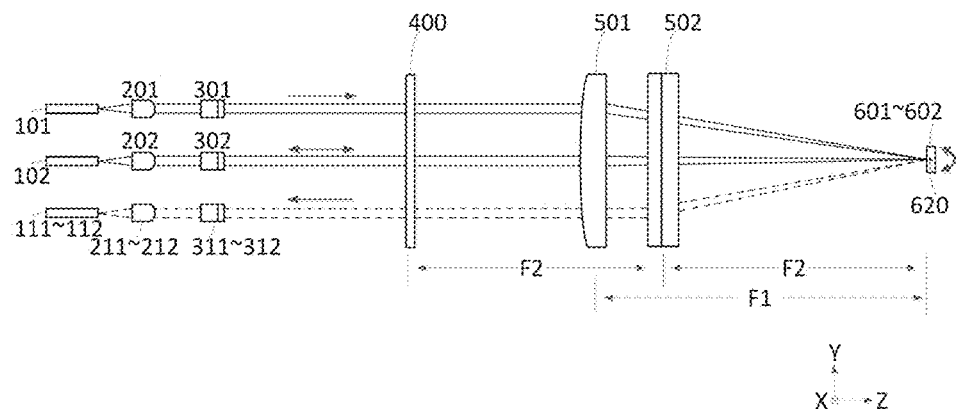
FIG. 1(c) is a side view of the first embodiment of the multicast exchange optical switch according to the present invention.

It should be noted that when the MEMS mirrors are controlled to rotate about the first rotation axis 620 to select the input signals, it is possible that other unwanted reflected light may be coupled to some input port. As shown in FIG. 1(c), when the signal light from the first input port 101 is selected to be coupled to the output port, the reflected light from the second input port 102 will be reflected back to the second input port itself.

Figure 4:
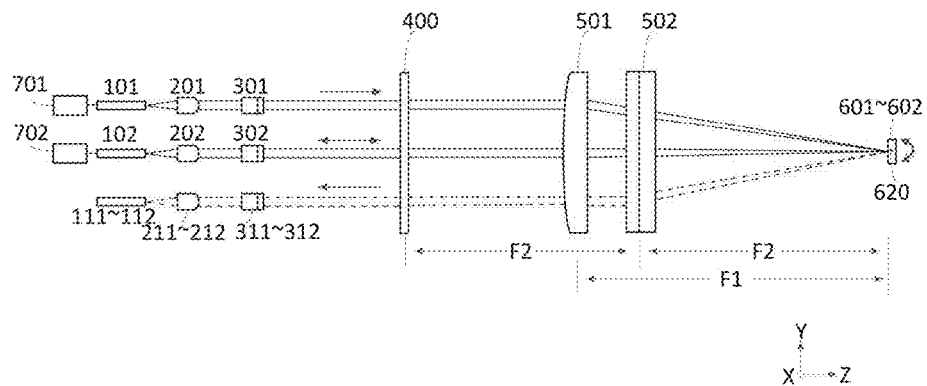
FIG. 4 is a side view of the multicast exchange optical switch according to FIG. 1 incorporating an optical isolator.

To address the direction problem caused in the above-mentioned situation, one possible way is to add an optical isolator to the input port of the device. The optical isolator is not a significant element to the multicast exchange switch the present invention pertains to, and it is generally connected to the input port of the device by welding. FIG. 4 shows a multicast exchange optical switch including optical isolators connected in series. As shown, the first input port 101 and the second input port 102 are connected in series with a first isolator 701 and a second isolator 702, respectively. Thus, the second optical isolator 702 may prevent the reflected light from the second input port 102 from being coupled back to the second input port 102.

FIG. 2 is a schematic diagram showing a second embodiment of the multicast exchange optical switch according to the present invention. In FIG. 2, the input ports and the output ports are also denoted by the numerals of the embodiment shown in FIG. 1. However, it should be noted that the input ports and output ports are schematically shown as an array of collimators in this embodiment. Take the first input port 101 as an example. Both the first beam expanding micro-lens 221 and the fifth beam expanding micro-lens 321 are X-axis cylindrical lens, wherein the focal length $f_3$ of the first beam expanding micro-lens 221 is smaller than the focal length $f_4$ of the fifth beam expanding micro-lens 321. In the array of input collimators, the first collimator input port 101 is provided at the front focal plane of the first beam expanding micro-lens 221, and the rear focal plane of the first beam expanding micro-lens 221 is coincided with the front focal plane of the fifth beam expanding micro-lens 321. The collimated signal light from the first input port 101 passes through the first beam expanding micro-lens 221 and the fifth beam expanding micro-lens 321 sequentially and thus is expanded on the X axis. In this embodiment, the diffractive beam splitter 401 is a reflective grating. The spatial positions of the components and principle of the light beam propagation in the second embodiment of FIG. 2 are the same as those in the first embodiment, which will not be repeated here.

Figure 5A:
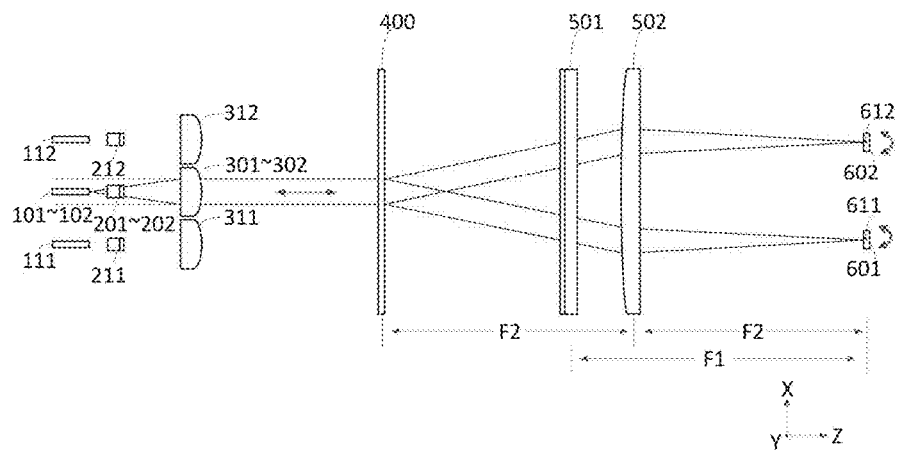
FIG. 5(a) shows a schematic diagram of the first embodiment of the present invention in which the MEMS is adjusted to a non-output state by rotating about a second rotation axis.
Figure 5B:
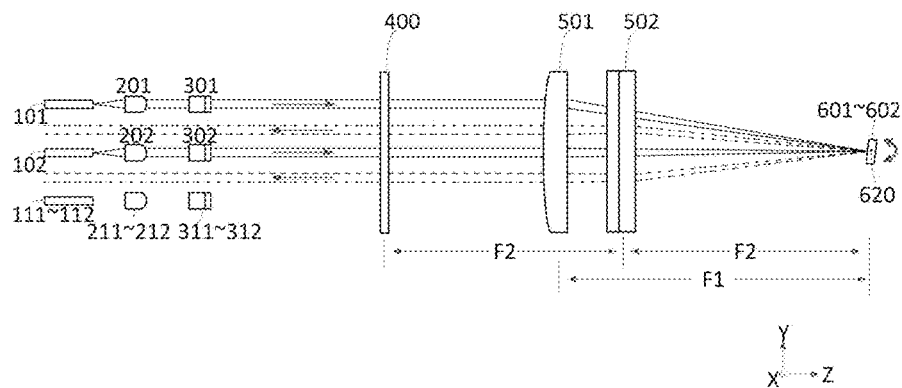
FIG. 5(b) shows a schematic diagram of the first embodiment of the present invention in which the MEMS is adjusted to a non-output state by rotating about a first rotation axis.

In the multicast exchange optical switch of the present invention, the input ports or the output ports may be spaced apart from each other by a certain distance according to size of the spot. In some cases, the MEMS mirrors may be controlled to rotate about the first rotation axis, the second rotation axis of the mirror 601 and the second rotation axis of the mirror 602, respectively, such that the reflected light impinges onto a region between two adjacent ports, resulting in a "non-output" state. FIGS. 5(a) and 5(b) are top view and side view of the first embodiment, respectively, showing a non-output state.

In FIG. 5(a), the reflected light beam overlaps the incident light beam in the X-Z plane, and they are separated by a distance in the Y direction. As shown, no output port receives the outgoing signals, and it is in the non-output state. Of course, the first mirror 601 may be adjusted to rotate anticlockwise about the second rotation axis 611 so that the reflected light beam is emitted below the first output port 111; similarly, the second mirror 602 may be adjusted to rotate clockwise about the second rotation axis 612 so that the reflected light beam is emitted above the second output port 112, thereby achieving the non-output state.

In FIG. 5(b), the first mirror 601~the second mirror 602 may rotate about the first rotation axis 620 such that the reflected light from the first input port is emitted from between the second input port and the output ports, and the reflected light from the second input port is emitted from between the first input port and the second input port, thereby achieving the non-output state.

As known, a hitless switching is desirable when adjusting the MEMS mirrors to perform switching. For example, when an output port is switched from a signal $M_1$ to a signal $M_2$, it is required that no other signal is received during the switching. If the switching is carried out by rotating the MEMS mirrors about the first rotation axis directly, the output port will experience all signals from signal $M_1$ to signal $M_2$.

A hitless switching may be accomplished by leaving a distance between input/output ports sufficient to reach the non-output state. When the MEMS mirrors need to rotate about the first rotation axis so as to switch the input signal from $M_1$ to $M_2$, the MEMS mirrors may be first controlled to rotate about the respective rotation axes to the non-output state, and then the MEMS mirrors are controlled to rotate about the first rotation axis to switch the signal. Finally, the MEMS mirrors may be controlled to rotate about the respective rotation axes to return to the original port.

Figure 6A:
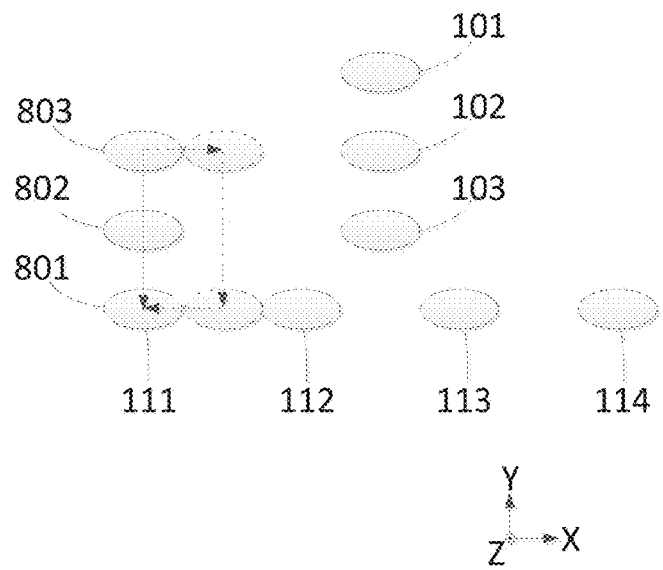
FIG. 6(a) is a schematic diagram showing spot movement for a direct switching and a hitless switching of the input signal.

FIG. 6(a) schematically shows spot movement for direct switching and hitless switching of the input signal in a 3×4 multicast exchange switch. As shown in FIG. 6(a), a first input port 101~a third input port 103 form an input port array, a first output port 111~a fourth output port 114 form an output port array. A first input signal component 801~third input signal component 803 correspond to signal components of the same diffraction order at the output port 111 from the first input port 101~the third input port 103. At beginning, the first signal component 801 from the first input port 101 is output by the first output port 111. When it is switched to third input signal component 803 from the third input port 103, one may control an MEMS mirror corresponding to the diffraction order of the component 803 to directly rotate about the first rotation axis. In this case, the second signal component 802 from the second input port 102 will reach the first output port 111 before the third input signal component 803 does, as indicated by the solid line path in FIG. 6(a). For a hitless switching, the MEMS mirror may first rotate about the second rotation axis such that the first signal component 801~the third signal component 803 are located between the output ports in the X direction, achieving the non-output state. Then, the MEMS mirror may rotate about the first rotation axis such that the third input signal component 803 is aligned to the first output port 111 in the X direction. Finally, the MEMS mirror may rotate about the second rotation axis such that the third input signal component 803 is coincided with the first output port 111, as shown by the broken line path in FIG. 6(a).

The MEMS mirrors may rotate about the second rotation axis so as to switch the output port from $N_1$ to $N_2$. Similarly, if one controls the MEMS mirror to directly rotate about the second rotation axis, the output signal will experience all ports from $N_1$ to $N_2$. Alternatively, one may control the MEMS mirror to first rotate about the first rotation axis to obtain the non-output state, and then rotate about the second rotation axis to switch the output port, at last rotate about the first rotation axis to select the original signal.

Figure 6B:
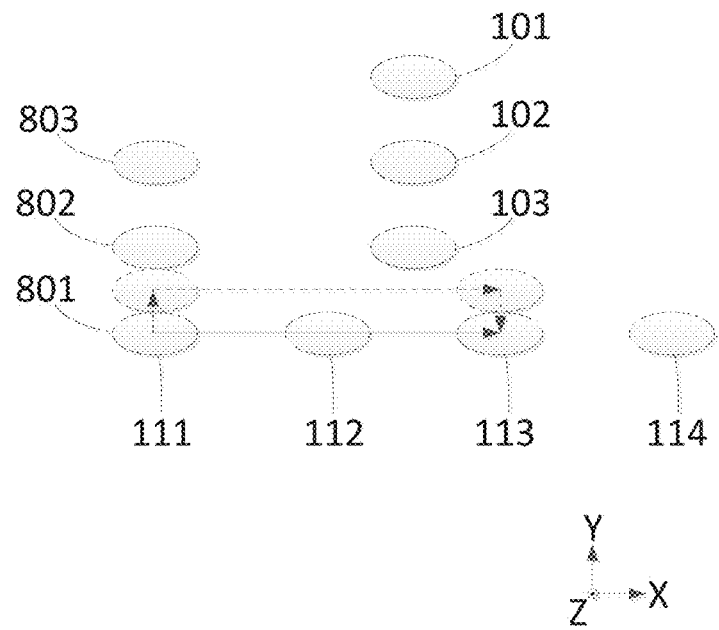
FIG. 6(b) is a schematic diagram showing spot movement for a direct switching and a hitless switching of the output port.

FIG. 6(b) schematically shows spot movement for direct switching and hitless switching of the output port in the 3×4 multicast exchange switch. The solid line path shows a direct switching process for the first signal component 801 of the first input port from the first output port 111 to the third output port 113. In this case, the first input signal component 801 will pass across the second output port 112 first before it arrives at the third output port 113. The broken line path shows a hitless switching process in which the MEMS mirror first rotate about the first rotation axis so that the first signal component 801 may be located between the output port and the input port in the Y direction, achieving the non-output state. Then, the MEMS mirror may rotate about the second rotation axis so that the first input signal component 801 is aligned to the third output port 113 in the Y direction. At last, the MEMS mirror may rotate about the first rotation axis so that the first input signal component 801 is coincided with the third output port 113.

In some other embodiments of the present invention, each input port may be configured with an optical isolator. In general, the optical isolator may be connected to the input port by welding. As shown in FIG. 4, the first isolator 701 and the second isolator 702 may be connected in series with the first input port 101 and the second input port 102, respectively. For a multicast exchange optical switch equipped with the optical isolator at each input port, the spacing to obtain the non-output state is needed only in the Y-direction in order to realize the hitless switching, while the ports may be arranged compactly in the X direction, thereby reducing size of the device.

In such a case, if the output port needs to be switched from $N_1$ to $N_2$ by rotating the MEMS mirror about the second rotation axis, the hitless switching process may be the same as the broken line path shown in FIG. 6(b), which will not be repeated here. When the input signal needs to be switched from $M_1$ to $M_2$ by rotating the MEMS mirror about the first rotation axis, since the ports are compactly arranged in the X direction, the non-output state can not be achieved by rotating the MEMS mirror about the second rotation axis. Next, a hitless switching process for the multicast exchange switch including the optical isolator configured at the input port and the output ports compactly arranged in the X direction will be described in conjunction with FIG. 7.

Figure 7:
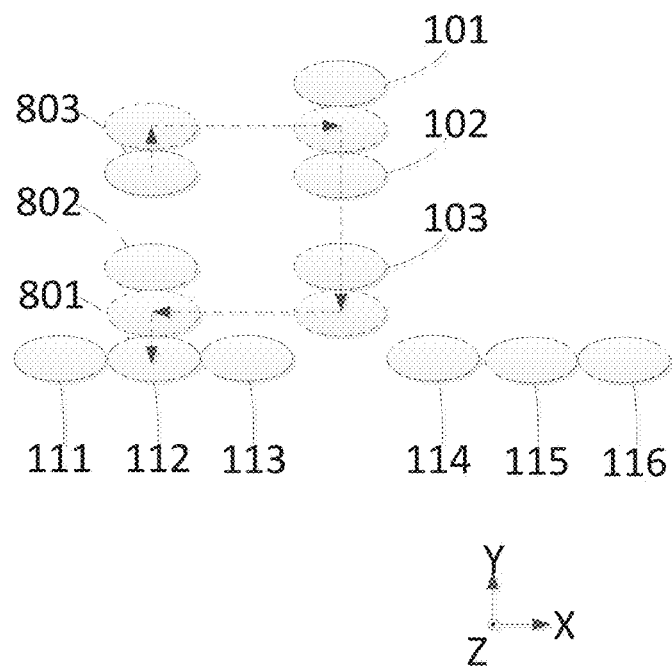
FIG. 7 is a schematic diagram showing spot movement for a hitless switching of the input signal in a multicast exchange optical switch having an isolator.

FIG. 7 shows an example of a 3×6 multicast exchange switch. At beginning, the first signal component 801 from the first input port 101 is output through the second output port 112, and the signal light for the second output port 112 needs to be switched from the first signal component 801 to the third signal component 803. First, the MEMS mirror may rotate about the first rotation axis to the non-output state, and then rotate about the second rotation axis until the first signal component 801~the third signal component 803 of the signal light are aligned to the first input port 101~the third input port 103 in the Y direction. Next, the MEMS mirror rotates about the first rotation axis again to selectively position the third signal component 803 to a non-light area closest to the output ports along the X axis. In this step, the optical isolator blocks the inverse signal lights 801~803 coupled to the first output port 101~the third output port 103. Nest, the MEMS mirror rotates about the second rotation axis so that the third input signal component 803 is aligned to the second output port 112 in the Y direction. Finally, the MEMS mirror may be finely adjusted to rotate about the first rotation axis so that the third input signal component 803 is coincided with the second output port 112, thereby completing the hitless switching process.

It should be noted that the paths for the hitless switching shown in FIGS. 6 and 7 are not the only paths.

The multicast exchange optical switch of the present invention can deliver the signal light from any input port to any output port; any one of the output ports can receive signal light from any one of the input ports.

While some specific embodiments of the invention have been described by way of example, those skilled in the art may appreciate from reading and understanding of the specification and drawings that various changes in form and details may be made to the inventive device without departing from the spirit and scope of the invention, especially functions as discussed above. Such changes shall fall within the scope of the accompanying claims and their equivalents.

The invention claimed is:

1. A multicast exchange optical switch comprising:
    M input ports arranged in a first direction, where M is an integer more than or equal to 1;
    N output ports arranged in a second direction perpendicular to the first direction, where N is an integer more than or equal to 1;
    a diffractive beam splitter configured to diffract each signal beam from the input ports into at least N sub-beams corresponding to N diffraction orders dispersed along the second direction thereby generating M×N sub-beams;
    an optical focusing component configured to focus M sub-beams of the M×N sub-beams corresponding to the same diffraction order, the optical focusing component comprising a first focusing lens and a second focusing lens having rear focal planes coincided with each other, the first focusing lens being configured to focus on the first direction sub-beams from the respective input ports having the same diffraction order, the second focusing lens being configured to focus on the second direction sub-beams from the same input port, respectively; and
    a 1×N array of reflective devices provided at the rear focal planes of the first focusing lens and the second focusing lens coincided with each other so that each of the N reflective devices receives the M sub-beams corresponding to the same diffraction order, each reflective device being configured to selectively reflect any one of the M sub-beams back to any of the N output ports through the optical focusing component and the diffractive beam splitter.

2. The multicast exchange optical switch of claim 1 wherein the input ports and the output ports comprise an array of optical fibers configured with an array of micro-lens to collimate signal beams from or to the input or output fibers.

3. The multicast exchange optical switch of claim 2 wherein the array of micro-lens comprises a first-direction micro cylindrical lens and a second-direction micro cylindrical lens provided for each of the optical fibers.

4. The multicast exchange optical switch of claim 3 wherein the second-direction micro cylindrical lens has a focal length $f_1$ larger than a focal length $f_2$ of the first-direction micro cylindrical lens, and each of the optical fibers is positioned at a front focal plane of the corresponding first- and second-direction micro cylindrical lenses.

5. The multicast exchange optical switch of claim 1 wherein the input ports and the output ports comprise an array of collimators configured with an array of beam-expanding micro-lenses.

6. The multicast exchange optical switch of claim 5 wherein the array of beam-expanding micro-lenses comprises a first beam-expanding micro-lens and a second beam-expanding micro-lens provided for each of the collimators, the first beam-expanding micro-lens and the second beam-expanding micro-lens both are second-direction cylindrical lenses.

7. The multicast exchange optical switch of claim 6 wherein the first beam-expanding micro-lens has a focal length $f_3$ smaller than a focal length $f_4$ of the second beam-expanding micro-lens, each of the collimators is positioned at a front focal plane of the first beam-expanding micro-lenses, and the rear focal plane of the first beam-expanding micro-lens is coincided with a front focal plane of the second beam-expanding micro-lens.

8. The multicast exchange optical switch of claim 1 wherein the diffractive beam splitter comprises a reflective grating or a transmissive grating.

9. The multicast exchange optical switch of claim 8 wherein the grating has a line spacing such that the N sub-beams each have a dispersion angle smaller than an angle between two adjacent sub-beams of the N sub-beams.

10. The multicast exchange optical switch of claim 1 wherein the first focusing lens is a first-direction cylindrical lens, and the second focusing lens is a second-direction cylindrical lens.

11. The multicast exchange optical switch of claim 1 wherein each of the reflective devices is configured to be rotatable about a first rotation axis to select a signal sub-beam to output and about a second rotation axis to select an output port for the selected sub-beam, the first rotation axis is parallel to the second direction, and the second rotation axis is parallel to the first direction.

12. The multicast exchange optical switch of claim 1 wherein the 1×N array of reflective devices comprises an MEMS mirror array.

13. The multicast exchange optical switch of claim 1 wherein each of the input ports is configured with an optical isolator.

14. The multicast exchange optical switch of claim 13 wherein two or more of the output ports are arranged compactly with respect to each other.

15. The multicast exchange optical switch of claim 1 wherein the output ports are spaced apart from each other by a distance large enough to receive a spot to be incident into the output ports.

* * * * *